United States Patent [19]
Van Le

[11] Patent Number: 5,281,946
[45] Date of Patent: Jan. 25, 1994

[54] HIGH-SPEED MAGNITUDE COMPARATOR CIRCUIT

[75] Inventor: Toan Van Le, Austin, Tex.

[73] Assignee: Motorola, Inc., Schaumburg, Ill.

[21] Appl. No.: 930,952

[22] Filed: Aug. 17, 1992

[51] Int. Cl.$^5$ .......................... G05B 1/03; G06F 7/02
[52] U.S. Cl. ............................ 340/146.2; 365/189.01; 365/230.01
[58] Field of Search ..................... 307/355; 340/146.2; 365/189.07, 189.08, 230.01, 189.01

[56] References Cited

U.S. PATENT DOCUMENTS

| | | | |
|---|---|---|---|
| 3,622,987 | 11/1971 | Borkan | 340/146.2 |
| 3,656,109 | 4/1972 | Conway | 340/146.2 |
| 4,450,432 | 5/1984 | Schmidtpott et al. | 340/146.2 |
| 4,479,217 | 10/1984 | Philippides | 340/146.2 |
| 4,728,927 | 3/1988 | Aman | 340/146.2 |
| 5,003,286 | 3/1991 | Carbonaro et al. | 340/146.2 |

*Primary Examiner*—John Zazworsky
*Attorney, Agent, or Firm*—Paul J. Polansky; James L. Clingan, Jr.

[57] ABSTRACT

A high-speed magnitude comparator circuit (30) receives two n-bit operands and provides first and second signals for each bit position. The first signal is a logical OR of a complement of a corresponding bit from the first operand and a corresponding bit from the second operand; the second signal is a logical AND of a complement of the corresponding bit from the first operand and the corresponding bit from the second operand. The second signal corresponding to the least-significant bit position is formed differently, as the logical OR of a complement of the least-significant bit of the first operand and the least-significant bit of the second operand. These signals are then provided to pullup (34) and pulldown (35) columns of transistors to determine the results of the comparison in parallel. Thus, the operands need only propagate through three logic levels to provide the result.

23 Claims, 2 Drawing Sheets

HIGH-SPEED MAGNITUDE COMPARATOR CIRCUIT

FIELD OF THE INVENTION

This invention relates generally to digital circuits, and more particularly, to magnitude comparator circuits.

BACKGROUND OF THE INVENTION

A useful function in many integrated circuits, such as data processors, is a magnitude comparison of two numbers. For example, a data processor core may be integrated with several different on-chip peripheral circuits, such as on-chip memory. For different integrated circuit designs using the data processor core, the size of the on-chip memory varies. The data processor core must determine whether a memory access cycle is to the on-chip memory or to off-chip memory. The data processor core makes this determination by performing a magnitude comparison between critical address bits and a preprogrammed address space size. If the magnitude comparator detects that the address is less than or equal to pre-programmed address space size, then the access is to internal memory. Otherwise, the access is to external memory. Since data processor cores using current technology may operate with clock speeds of approximately 40 MHz, the magnitude comparator must be very fast to avoid delaying the memory access.

There are two types of known magnitude comparator circuits. The first type is a sequential magnitude comparator, such as the AMD 9324 5-bit comparator. The sequential comparator first compares the most-significant bit of each of the two operands. Logic circuitry determines whether the first operand is larger than, equal to, or less than the second operand. If the most-significant bits are not equal to each other, the magnitude comparator can then provide an output signal representing the result of the comparison. However, if the bits are equal to each other, then the comparison is indeterminate and must proceed to the next-most-significant bit position. Likewise, the results of this comparison may determine the overall result, but it may be necessary for the comparison to proceed to the next-most-significant bit, and so on, until the least-significant bits are compared. In the worst case, the comparison will not be complete until all bits are compared, requiring approximately seven logic levels for a five-bit comparator.

The second type of magnitude comparator is a bit-cell magnitude comparator. The bit-cell magnitude comparator simultaneously compares corresponding bits from each bit position of the two operands. Each bit cell activates one of three output signals, a less-than signal designated "LT", a greater than signal designated "GT", or an equal to signal designated "EQ". Corresponding LT, GT, and EQ signals from all bit cells are then combined using random logic to provide overall LT, GT, and EQ signals. While this design may reduce the number of logic levels below that of the sequential design, it may also require the use of multiple-input logic gates, which increase switching time. For example, a five-bit magnitude comparator may be implemented in approximately five logic levels by using multiple-input logic gates.

SUMMARY OF THE INVENTION

Accordingly, there is provided, in one form, a high-speed magnitude comparator circuit comprising a plurality of logic cells, a least-significant logic cell, a signal line, a pullup portion, and a pulldown portion. The plurality of logic cells correspond to a plurality of bit positions in first and second operands except for a least significant bit position. Each logic cell provides a first output signal equal to a logical OR of a complement of a corresponding bit of the first operand and a corresponding bit of the second operand, and a second output signal equal to a logical AND of the complement of the corresponding bit of the first operand and the corresponding bit of the second operand. The least-significant logic cell provides a first output signal equal to a logical OR of a complement a least significant bit of the first operand and a least significant bit of the second operand. The least-significant logic cell also provides a second output signal equal to a logical OR of the complement of the least significant bit of the first operand and the least significant bit of the second operand. The signal line conducts an output signal. The pullup portion includes a plurality of columns of transistors, and couples the signal line to a first power supply voltage terminal in response to the first and second output signals of both the plurality of logic cells and the least-significant logic cell indicating that the first operand is greater than the second operand. The pulldown portion includes a plurality of columns of transistors, and couples the signal line to a second power supply voltage terminal in response to the first and second output signals of both the plurality of logic cells and the least-significant logic cell indicating that the first operand is less than or equal to the second operand.

These and other features and advantages will be more clearly understood from the following detailed description taken in conjunction with the accompanying drawings.

DETAILED DESCRIPTION OF A PREFERRED EMBODIMENT

Figure 1:
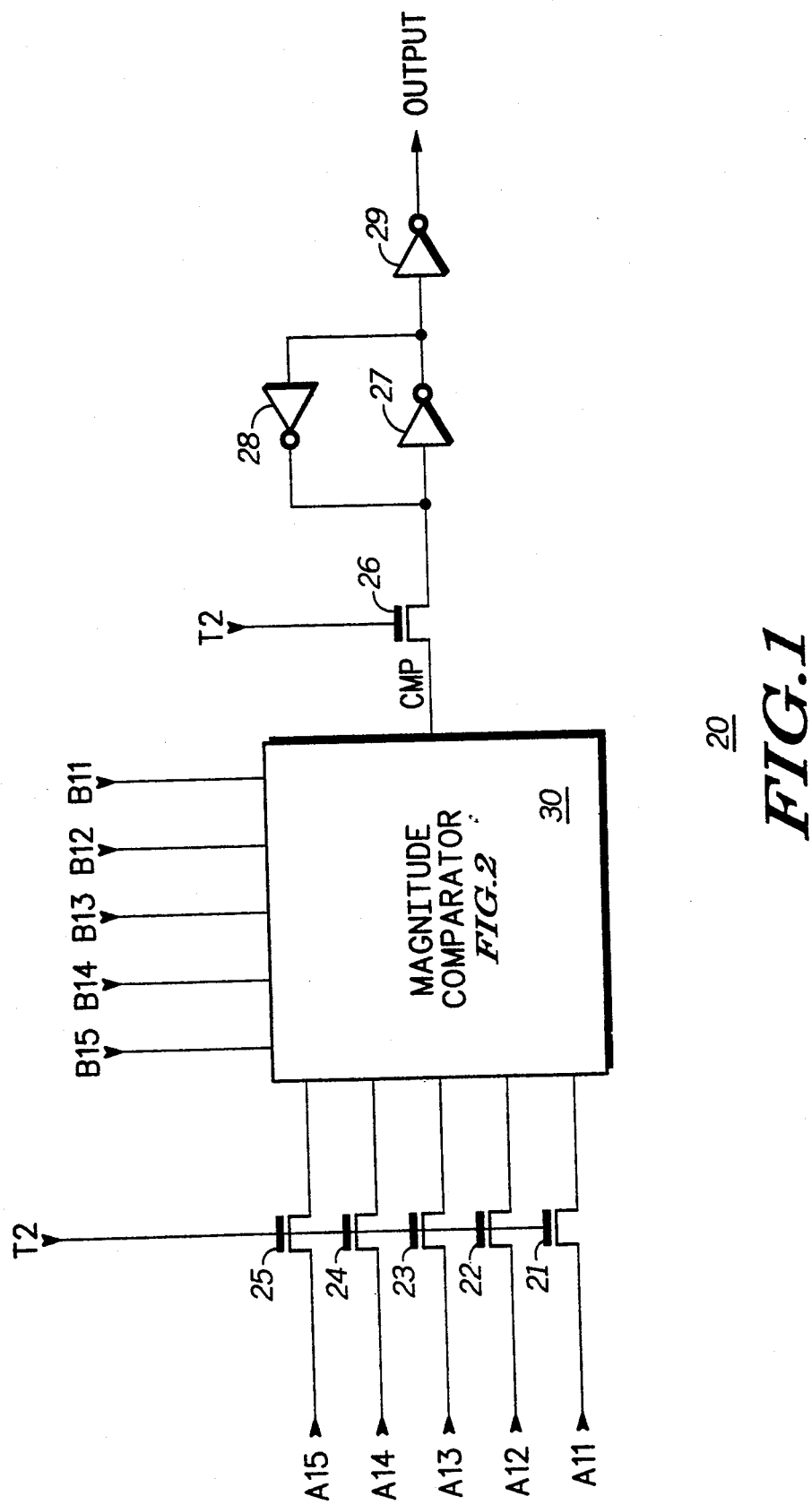
FIG. 1 illustrates in partial block diagram, partial logic diagram, and partial schematic form a portion of a data processing system including a magnitude comparator according to the present invention.

FIG. 1 illustrates in partial block diagram, partial logic diagram, and partial schematic form a portion of a data processing system 20 including a magnitude comparator 30 in according to the present invention. Portion 20 compares a portion of an address field A15–A11 with corresponding preprogrammed bits B15–B11. The pre-programmed address B15–B11 identifies which addresses are included in an on-chip memory, and which accesses are to an external memory. If the address of a cycle is to a preprogrammed internal address space, then a binary comparison will indicate that A15–A11 is less than or equal to B15–B11. For this comparison, magnitude comparator 30 is a 5-bit comparator.

Five N-channel transistors 21–25 gate in the address signals. Transistors 21–25 each have a first source/drain terminal for receiving a respective one of address signals A11–A15, a gate for receiving a timing signal labelled "T2", and a second source/drain terminal connected to a corresponding input terminal of magnitude comparator 30. Magnitude comparator 30 also receives preprogrammed signals B15-B11 as a second operand, and provides a signal labelled "CMP" as an output. Signal CMP is active at a logic high if (A15-A11>B-15-B11), and is inactive at a logic low if (A15-A11≦B-15-B11). An N-channel transistor 26 has a first source/drain terminal for receiving signal CMP, a gate for receiving signal T2, and a second source/drain terminal. An inverter 27 has an input terminal connected to the second source/drain terminal of transistor 26, and an output terminal. An inverter 28 has an input terminal connected to the output terminal of inverter 27, and an output terminal connected to the input terminal of inverter 27. An inverter 29 has an input terminal connected to the output terminal of inverter 27, and an output terminal for providing an output signal labelled "OUTPUT".

Signal T2 is active during approximately one-half of a clock signal. If the clock signal has a frequency of 40 MHz, then signal T2 is active for approximately 6.25 nanoseconds (ns). In the illustrated embodiment, address signals A15-A11 are not valid until almost one-half of the time signal T2 is active, and magnitude comparator 30 must perform the comparison within approximately T2/2, or 3.5 nanoseconds. In current complementary-metal-oxide-semiconductor (CMOS) technology using one-micron gate lengths, magnitude comparators with five gate delays cannot provide outputs in the required time.

Figure 2:
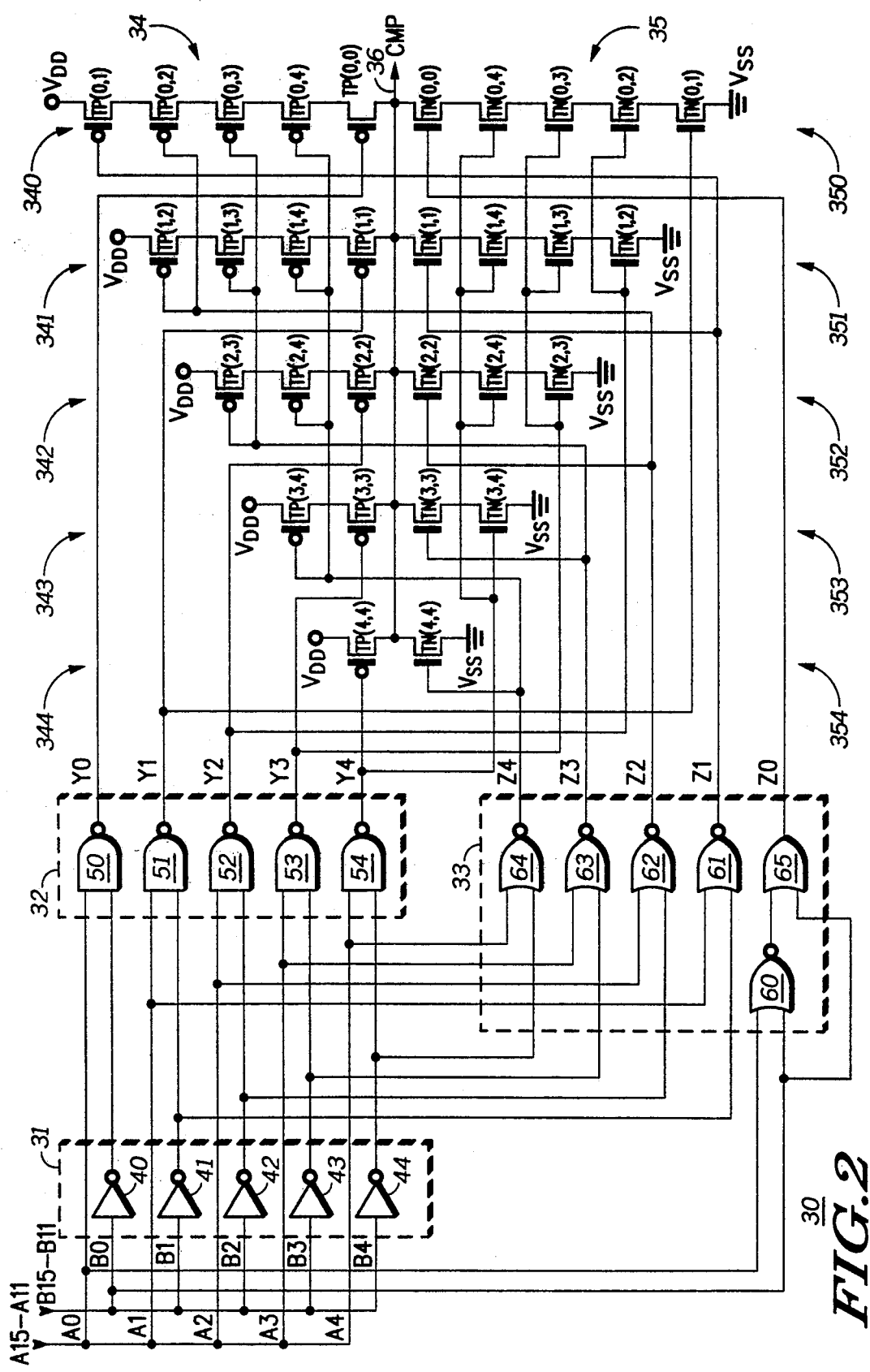
FIG. 2 illustrates in partial logic diagram and partial schematic form the magnitude comparator of FIG. 1.

FIG. 2 illustrates in partial logic diagram form and partial schematic form magnitude comparator 30 of FIG. 1. Magnitude comparator 30 includes generally an inverter portion 31, a first logic portion 32, a second logic portion 33, a pullup portion 34, a pulldown portion 35, and an output signal line 36. Pullup portion 34 is coupled to first logic portion 32, to second logic portion 33, and to signal line 36 and provides a logic high level on signal line 36 in response to detecting a condition in which (A4:A0>B4:B0). To implement the magnitude comparator of FIG. 1, signals A15-A11 are received as signals A4-A0, and signals B15-B11 are received as signals B4-B0. Pulldown portion 35 is coupled to first logic portion 32, to second logic portion 33, and to signal line 36 and includes N-channel transistors which provide a logic low level on signal line 36 in response to detecting a condition in which (A4:A0≦B4:B0). Transistors in pullup portion 34 and pulldown portion 35 determine the logic level on signal line 36 in a parallel fashion. Thus, magnitude comparator 30 is very fast, having only three gate delays, and is able to meet the timing requirements of the data processor as illustrated in FIG. 1.

Inverter portion 31 includes inverters 40-44. Each of inverters 40-44 receives a respective one of input signals labelled "B0-B4" at an input terminal thereof, and has an output terminal. First logic portion 32 includes NAND gates 50-54. Each of NAND gates 50-54 has a first input terminal for receiving a respective one of input signals labelled "A0-A4", a second input terminal connected to an output terminal of a respective one of inverters 40-44, and an output terminal for providing a respective one of signals labelled "Y0-Y4".

Second logic portion 33 includes NOR gates 60-64, and an OR gate 65. NOR gates 61-64 each have a first input terminal for receiving a respective one of signals of A1-A4, a second input terminal respectively connected to the output terminals of inverters 41-44, and output terminals for respectively providing signals labelled "Z1-Z4". NOR gate 60 has a first input terminal for receiving signal A0, a second input terminal for receiving signal B0, and an output terminal. OR gate 65 has a first input terminal connected to the output terminal of NOR gate 60, a second input terminal for receiving signal B0, and an output terminal for providing a signal labelled "Z0".

Pullup portion 34 includes P-channel transistors arranged in five columns 340-344, each column corresponding to a bit position of the comparator. The transistors are labelled "TP(i, j)", where index i refers to the bit position, and index j refers to the signal received at the gate thereof. In a given column of transistors, j ranges from the bit position number to (n−1), where n is the size of the comparator. In the illustrated embodiment, comparator 30 is a five-bit comparator (n=5). For example, column 340 corresponds to bit position 0, and includes P-channel transistors labelled "TP(O, j)", where the j=0, 1, 2, 3, and 4. Transistor TP(0, 0) has a source, a gate for receiving signal Y0, and a drain connected to output signal line 36. Transistor TP(0, 1) has a source connected to a more-positive power supply voltage terminal labelled "$V_{DD}$", a gate for receiving signal Z1, and a drain. Transistor TP(0, 2) has a source connected to the drain of transistor TP(0, 1), a gate for receiving signal Z2, and a drain. Transistor TP(0, 3) has a source connected to the drain of transistor TP(0, 2), a gate for receiving signal Z3, and a drain. Transistor TP(0, 4) has a source connected to the drain of transistor TP(0, 3), a gate for receiving signal Z4, and a drain connected to the source of transistor TP(0, 0). Other columns are arranged in a corresponding fashion.

Pulldown portion 35 includes N-channel transistors arranged in five columns 350-354, each column corresponding to a bit position of the comparator. The transistors are labelled "TN(i, j)", where index i refers to the bit position, and index j refers to the signal received at the gate thereof. In a given column of transistors, j ranges from the bit position number to (n−1), where n is the size of the comparator. In the illustrated embodiment, comparator 30 is a five-bit comparator (n=5). For example, column 350 corresponds to bit position 0, and includes N-channel transistors labelled "TN(0, j)", where the j=0, 1, 2, 3, and 4 . Transistor TN(0, 0) has a drain connected to output signal line 36, a gate for receiving signal Z0, and a source Transistor TN(0, 1) has a drain, a gate for receiving signal Y1, and a source connected to a more-negative power supply voltage terminal labelled "$V_{SS}$". Transistor TN(0, 2) has a drain, a gate for receiving signal Y2, and a source connected to the drain of transistor TN(0, 1). Transistor TN(0, 3) has a drain, a gate for receiving signal Y3, and a source connected to the drain of transistor TN(0, 2). Transistor TN(0, 4) has a drain connected to the source of transistor TN(0, 0), a gate for receiving signal Y4, and a source connected to the drain of transistor TN(0, 3). Other columns are arranged in a corresponding fashion.

Equations 1-3, set forth below, describe the equations for signals $Y_i$ and $Z_j$:

$$Y_i = (A_i \cdot B_i')' = A_i' + B_i, 0 \leq i < n-1 \quad [1]$$

$$Z_i = (A_i + B_i')' = A_i' \cdot B_i, 0 < i \leq n-1 \quad [2]$$

$$Z_0 = (A_0 \cdot B_0')' = A_0' + B_0 \quad [3]$$

where (n=5) for magnitude comparator 30. Equations [1]-[3] illustrate that the operation of magnitude comparator 30 is scalable to different operand sizes. TABLE I illustrates the values assumed by signals Yi and Zi for various inputs:

TABLE I

| condition | Ai | Bi | Yi | Zi |
|---|---|---|---|---|
| Ai = Bi, i ≠ 0 | 0 | 0 | 1 | 0 |
| Ai < Bi, i ≠ 0 | 0 | 1 | 1 | 1 |
| Ai > Bi, i ≠ 0 | 1 | 0 | 0 | 0 |
| Ai = Bi, i ≠ 0 | 1 | 1 | 1 | 0 |
| A0 = B0 | 0 | 0 | 1 | 1 |
| A0 < B0 | 0 | 1 | 1 | 1 |
| A0 > B0 | 1 | 0 | 0 | 0 |
| A0 = B0 | 1 | 1 | 1 | 1 |

Note that since magnitude comparator 30 provides output signal CMP in an active state in response to A4-A0 exceeding B4-B0, and in an inactive state in response to A4-A0 being less than or equal to B4-B0, there must be special logic when $A_0 = B_0$.

The following equation provides an expression for output signal CMP:

$$\begin{aligned}
CMP = \; & Y4' + \\
& Z4' \cdot Y3' + \\
& Z4' \cdot Z3' \cdot Y2' + \\
& Z4' \cdot Z3' \cdot Z2' \cdot Y1' + \\
& Z4' \cdot Z3' \cdot Z2' \cdot Z1' \cdot Y0' + \\
& Z4' + \\
& Y4' + Z3' + \\
& Y4' + Y3' + Z2' + \\
& Y4' + Y3' + Y2' + Z1' + \\
& Y4' + Y3' + Y2' + Y1' + Z0'
\end{aligned} \quad [4]$$

Equation [4] groups terms in the expression for signal CMP to correspond to circuitry shown in FIG. 2 for implementing the equation. The first term in line 1 corresponds to P-channel transistor TP(4, 4) in fifth column 344; line 6 corresponds to N-channel transistor TN(4, 4) in fifth column 354; and so on.

It is also possible to understand the operation of magnitude comparator 30 from the structure of pullup portion 34 and pulldown portion 35. If A4>B4, then Y4=0 and Z4=0. Thus, transistor TP(4, 4) is conductive and pulls signal line 36 to $V_{DD}$. Transistor TN(4, 4) is nonconductive. If A4<B4 then Y4=1 and Z4=1. Thus, transistor TN(4, 4) is conductive and pulls signal line 36 to $V_{SS}$. Transistor TP(4, 4) is nonconductive. However, if A4=B4, then Y4=1 and Z4=0 and both transistors TP(4, 4) and TN(4, 4) are nonconductive, and the result depends on the lower-order bit positions. Since (Y4=1) and (Z4=0), transistors TP(3, 4) and TN(3, 4) are both conductive and the result depends on A3 and B3. If A3>B3, then (Y3=0) and (Z3=0), and transistor TP(3, 4) is conductive to pull up signal line 36 to $V_{DD}$. Transistor TN(3, 3) is nonconductive. Further columns proceed in a similar fashion. The difference between magnitude comparator 30 and known sequential and bit-cell comparators is that the determination in each column proceeds simultaneously, reducing the maximum delay. Magnitude comparator 30 provides signal CMP on signal line 36 after only three gate delays. For 1.0 micron gate-length CMOS technology, this delay is approximately 3.4 ns.

It is important for each critical transistor—for example, transistor TP(2, 2) in column 342 and transistor TN(1, 1) in column 351—to have its drain connected to signal line 36 to maximize switching speed. While magnitude comparator 30 is a 5-bit magnitude comparator, the same pattern of transistors can be used to implement larger or smaller comparators. However, because the number of transistors connected in series increases the capacitance during switching, for magnitude comparators of greater than 8 bits, it is preferable to cascade smaller-sized comparators by well-known cascading techniques.

For example, portions of magnitude comparator 30 can be used to implement a two-bit comparator. Logic gates 40, 41, 50, 51, 60, and 65 can be used to form signals Y0, Y1, Z0, and Z1. Transistor TP(1, 1) in column 341, transistor TN(1, 1) in column 351, transistors TP(0, 1) and TP(0, 0) in column 340, and transistors TN(0, 0) and TN(0, 1) in column 350 are retained to provide signal CMP. In order to expand the magnitude comparator to three bits, one must additionally provide signals Y2 and Z2 and include transistors TP(2, 2), TP(1, 2), TP(0, 2), TN(2, 2), TN(1, 2), and TN(0, 2). For larger comparators, additional signals and transistors in pullup portion 34 and pulldown portion 35 are included in a like pattern.

Magnitude comparator 30 provides output signal CMP in a logic high state if operand A4:A0 is greater than operand B4:B0, and in a logic low state otherwise. To provide output signal CMP in a logic high state if operand A4:A0 is less than or equal to operand B4:B0, it is only necessary to switch the inputs. To provide an EQ signal, an exclusive-OR between bit positions of each bit may be used. GT and LT signals can then each be generated from signals EQ and CMP with the addition of an extra level of logic.

While the invention has been described in the context of a preferred embodiment, it will be apparent to those skilled in the art that the present invention may be modified in numerous ways and may assume many embodiments other than that specifically set out and described above. For example, an arbitrarily-sized n-bit comparator is possible according to the present invention. Accordingly, it is intended by the appended claims to cover all modifications of the invention which fall within the true spirit and scope of the invention.

I claim:

1. A high speed magnitude comparator circuit, comprising:

a plurality of logic cells corresponding to a plurality of bit positions in first and second operands except for a least significant bit position, each logic cell providing a first output signal equal to a logical OR of a complement of a corresponding bit of said first operand and a corresponding bit of said second operand, and a second output signal equal to a logical AND of said complement of said corresponding bit of said first operand and said corresponding bit of said second operand;

a least-significant logic cell for providing a first output signal equal to a logical OR of a complement a least significant bit of said first operand and a least significant bit of said second operand, and a second output signal equal to a logical OR of said complement of said least significant bit of said first operand and said least significant bit of said second operand;

a signal line for conducting an output signal;

a pullup portion including a plurality of columns of transistors, for coupling said signal line to a first power supply voltage terminal in response to said first and second output signals of both said plurality of logic cells and said least-significant logic cell indicating that said first operand is greater than said second operand; and a pulldown portion including a plurality of columns of transistors, for coupling said signal line to a second power supply voltage terminal in response to said first and second output signals of both said plurality of logic cells and said least-significant logic cell indicating that said first operand is less than or equal to said second operand.

2. The high speed magnitude comparator circuit of claim 1, wherein said pullup portion comprises a plurality of columns of transistors, each column of transistors corresponding to one of said bit positions, each column of transistors including at least one transistor serially coupled between a first power supply voltage terminal and said signal line and receiving one of said plurality of first signals corresponding to said bit position.

3. The high speed magnitude comparator circuit of claim 2, wherein said plurality of columns of transistors comprises a first column corresponding to said most significant bit position, including a first transistor having a first current electrode coupled to said first power supply voltage terminal, a control electrode for receiving said first output signal corresponding to said most significant bit position, and a second current electrode coupled to said signal line.

4. The high speed magnitude comparator circuit of claim 3, wherein said plurality of columns of transistors comprises a second column of transistors, said second column comprising:

a second transistor having a first current electrode coupled to said first power supply voltage terminal, a control electrode for receiving a second signal corresponding to said most-significant bit position, and a second current electrode; and a third transistor having a first current electrode coupled to said second current electrode of said second transistor, a control electrode for receiving a first signal corresponding to a next-most-significant bit position, and a second current electrode coupled to said signal line.

5. The high speed magnitude comparator circuit of claim 2, wherein each transistor in said plurality of columns of transistors in said pullup portion is a P-channel MOS transistor.

6. The high speed magnitude comparator circuit of claim 1, wherein said pulldown portion comprises a plurality of columns of transistors, each column of transistors corresponding to one of said bit positions, each column of transistors including at least one transistor serially coupled between a second power supply voltage terminal and said signal line and receiving one of either said plurality of second signals or said third signal, corresponding to said bit position.

7. The high speed magnitude comparator circuit of claim 6, wherein said pulldown portion comprises a plurality of columns of transistors, each column of transistors corresponding to one of said bit positions, each column of transistors including at least one transistor serially coupled between said signal line and a second power supply voltage terminal and receiving either one of said plurality of second signals or said third signal, corresponding to said bit position.

8. The high speed magnitude comparator circuit of claim 7, wherein said plurality of columns of transistors comprises a first column corresponding to said most significant bit position, including a first transistor having a first current electrode coupled to said signal line, a control electrode for receiving said second output signal corresponding to said most significant bit position, and a second current electrode coupled to said second power supply voltage terminal.

9. The high speed magnitude comparator circuit of claim 8, wherein said plurality of columns of transistors comprises a second column of transistors, said second column comprising:

a second transistor having a first current electrode coupled to said signal line, a control electrode for receiving a second signal corresponding to a next-most-significant bit position, and a second current electrode; and a third transistor having a first current electrode coupled to said second current electrode of said second transistor, a control electrode for receiving a first signal corresponding to said most-significant bit position, and a second current electrode coupled to said second power supply voltage terminal.

10. The high speed magnitude comparator circuit of claim 7, wherein each transistor in said plurality of columns of transistors in said pulldown portion is an N-channel MOS transistor.

11. A high speed magnitude comparator circuit, comprising:

first and second input ports respectively receiving first and second operands, each of said first and second operands having a predetermined number of bits ordered from a most-significant bit to a least-significant bit;

first logic means coupled to said first and second input ports, for providing a plurality of first signals corresponding to each of said bit positions of said first and second operands, each first signal being a logical OR of a complement of a corresponding bit of said first operand and a corresponding bit of said second operand;

second logic means coupled to said first and second input ports, for providing a plurality of second signals corresponding to each of said bit positions of said first and second operands except for said first bit position, each second signal being a logical AND of a complement a corresponding bit of said first operand and a corresponding bit of said second operand;

third logic means coupled to said first and second input ports, for providing a third signal equal to a logical OR of a complement of said least significant bit of said first operand and said least significant bit of said second operand;

a signal line coupled to said first, second, and third logic portions for conducting an output signal of the magnitude comparator thereon;

a pullup portion coupled to said first, second, and third logic portions and to said signal line, for coupling said signal line to a first power supply voltage terminal in response to a value of said first operand exceeding a value of said second operand; and a pulldown portion coupled to said first, second, and third logic portions and to said signal line, for coupling said signal line to a second power supply voltage terminal in response to said value of said first operand being less than or equal to said value of said second operand.

12. The high speed magnitude comparator circuit of claim 11, wherein said pullup portion comprises a plurality of columns of transistors, each column of transistors corresponding to one of said bit positions, each column of transistors including at least one transistor serially coupled between a first power supply voltage terminal and said signal line and receiving one of said plurality of first signals corresponding to said bit position.

13. The high speed magnitude comparator circuit of claim 12, wherein said plurality of columns of transistors comprises a first column corresponding to said most significant bit position, including a first transistor having a first current electrode coupled to said first power supply voltage terminal, a control electrode for receiving said first output signal corresponding to said most significant bit position, and a second current electrode coupled to said signal line.

14. The high speed magnitude comparator circuit of claim 13, wherein said plurality of columns of transistors comprises a second column of transistors, said second column comprising:
a second transistor having a first current electrode coupled to said first power supply voltage terminal, a control electrode for receiving a second signal corresponding to said most-significant bit position, and a second current electrode; and
a third transistor having a first current electrode coupled to said second current electrode of said second transistor, a control electrode for receiving a first signal corresponding to a next-most-significant bit position, and a second current electrode coupled to said signal line.

15. The high speed magnitude comparator circuit of claim 12, wherein each transistor in said plurality of columns of transistors in said pullup portion is a P-channel MOS transistor.

16. The high speed magnitude comparator circuit of claim 11, wherein said pulldown portion comprises a plurality of columns of transistors, each column of transistors corresponding to one of said bit positions, each column of transistors including at least one transistor serially coupled between a second power supply voltage terminal and said signal line and receiving one of either said plurality of second signals or said third signal, corresponding to said bit position.

17. The high speed magnitude comparator circuit of claim 16, wherein said pulldown portion comprises a plurality of columns of transistors, each column of transistors corresponding to one of said bit positions, each column of transistors including at least one transistor serially coupled between said signal line and a second power supply voltage terminal and receiving either one of said plurality of second signals or said third signal, corresponding to said bit position.

18. The high speed magnitude comparator circuit of claim 17, wherein said plurality of columns of transistors comprises a first column corresponding to said most significant bit position, including a first transistor having a first current electrode coupled to said signal line, a control electrode for receiving said second output signal corresponding to said most significant bit position, and a second current electrode coupled to said second power supply voltage terminal.

19. The high speed magnitude comparator circuit of claim 18, wherein said plurality of columns of transistors comprises a second column of transistors, said second column comprising:
a second transistor having a first current electrode coupled to said signal line, a control electrode for receiving a second signal corresponding to a next-most-significant bit position, and a second current electrode; and
a third transistor having a first current electrode coupled to said second current electrode of said second transistor, a control electrode for receiving a first signal corresponding to said most-significant bit position, and a second current electrode coupled to said second power supply voltage terminal.

20. The high speed magnitude comparator circuit of claim 17, wherein each transistor in said plurality of columns of transistors in said pulldown portion is an N-channel MOS transistor.

21. A high speed magnitude comparator circuit comprising:
first logic means for providing a first signal equal to a logical OR of a complement of a least significant bit of a first operand and a least significant bit of a second operand;
second logic means for providing a second signal equal to a logical OR of a complement of a next-least significant bit of a first operand and a next-least significant bit of a second operand;
third logic means for providing a third signal equal to a logical AND of a complement of a next-least significant bit of a first operand and a next-least significant bit of a second operand;
fourth logic means for providing a fourth signal equal to a logical OR of a complement of a least significant bit of said first operand and a least significant bit of said second operand;
a signal line for conducting an output signal;
a first transistor having a first current electrode coupled to a first power supply voltage terminal, a control electrode for receiving said second signal, and a second current electrode coupled to said signal line;
a second transistor having a first current electrode coupled to said signal line, a control electrode for receiving said third signal, and a second current electrode coupled to a second power supply voltage terminal;
a third transistor having a first current electrode coupled to said first power supply voltage terminal, a control electrode for receiving said third signal, and a second current electrode;
a fourth transistor having a first current electrode coupled to said second current electrode of said third transistor, a control electrode for receiving said first signal, and a second current electrode coupled to said signal line;
a fifth transistor having a first current electrode coupled to said signal line, a control electrode for receiving said fourth signal, and a second current electrode; and
a sixth transistor having a first current electrode coupled to said second current electrode of said fifth transistor, a control electrode for receiving said second signal, and a second current electrode coupled to said second power supply voltage terminal.

22. The high speed magnitude comparator circuit of claim 21, wherein said first, third, and fourth transistors are P-channel MOS transistors, and wherein said second, fifth, and sixth transistors are N-channel MOS transistors.

23. The high speed magnitude comparator circuit of claim 21, wherein said first and second logic means each comprise:

an inverter having an input terminal for receiving a corresponding bit of said second operand, and an output terminal; and a NAND gate having a first input terminal for receiving a corresponding bit of said first operand, a second input terminal coupled to said output terminal of said inverter, and an output terminal for providing a corresponding one of said first and second signals.

* * * * *